Patented Jan. 9, 1934

1,943,268

UNITED STATES PATENT OFFICE

1,943,268

CHEMISTRY

Joseph Fleischer, Dayton, Ohio, assignor to Frigidaire Corporation, Dayton, Ohio, a corporation of Delaware No Drawing. Application April 30, 1932
Serial No. 608,573

15 Claims. (Cl. 62—170)

This invention relates to chemistry and more particularly to freezing solutions for use as "hold-overs" in intermittent refrigerating systems.

In intermittent refrigerating systems, particularly the intermittently operating compression refrigerating system and the intermittent absorption refrigerating system, it is frequently desirable to provide a freezing solution for maintaining the low temperature during idle periods of the system.

Heretofore, such solutions for use at temperatures below 32° have been cryohydrate solutions or solutions composed of water and a dissolved substance; the former have the disadvantage of freezing to hard solid masses and the latter of freezing and melting over a temperature range.

My invention provides a solution comprising a plurality of liquids which are only partly miscible and wherein substantially all the freezing takes place at a constant temperature, while at the same time it does not freeze completely solid.

As a specific example of my invention, I provide a mixture of water and normal butyl alcohol in the proportions of 90 to 10 by weight. I find that the greater part of this solution freezes at substantially 27° F., forming ice crystals while the remainder of the solution remains interspersed between the crystals, thus preventing the rupturing of the container of the freezing solution. This remaining solution does not freeze solid at temperatures prevailing in ordinary commercial refrigerating machines. This solution has the further important advantage of being non-corrosive. At ordinary temperatures this mixture forms two liquid layers.

As a second specific example of my invention, I provide a mixture of water and ethylene-glycol-mono-ethyl-ether-acetate, commonly known as cellosolve acetate, in the proportions of 80 to 20 by weight. I find that substantially all of the water in this solution freezes at substantially 23° F., but a sufficient amount of the solution remains liquid at all times to prevent complete solidification of the mixture, thereby avoiding possible rupture of the container. This mixture is also non-corrosive.

As a third specific example, I provide a mixture of water and diethylene-glycol-monobutyl-ether, commonly known as butyl carbitol in the proportions of 95 to 5 by weight. This mixture provides a substantially constant freezing solution having a freezing point of approximately 30° F., but like the other specific examples set forth above, has a sufficient portion of liquid remaining to prevent complete solidification of the solution.

In the event that it is desirable to produce a lower freezing and melting temperature than provided by any particular mixture of the type disclosed above, this result may be accomplished by the addition of a solute which is soluble in both of the liquids. For a specific example, in the case of the butyl alcohol-water mixture, a freezing temperature lower than 27 F. can be produced by the addition of a substance such as methyl alcohol.

While I have disclosed three specific forms of my invention, it should be understood that my invention is not limited thereto, but relates generically to a mixture of a plurality of liquids only partially miscible which mixture freezes and melts at a substantially constant temperature, while at the same time not freezing completely solid.

What I claim is as follows:

1. A hold-over solution for refrigerating apparatus comprising a plurality of liquids, in the mixture of which one liquid freezes at a constant temperature leaving liquid remaining interspersed between the crystals.

2. A hold-over solution for refrigerating apparatus comprising a mixture of water and another liquid which forms two liquid layers with the water at temperatures within the working range, the greater part of which freezes at a substantially constant temperature.

3. A hold-over solution for refrigerating systems comprising a mixture of water and another liquid which is only partially miscible with the water, the greater part of which freezes at a substantially constant temperature.

4. A hold-over solution for refrigerating systems comprising a mixture of water and another liquid which is only partially miscible with the water, which latter liquid enables the water to freeze at a constant temperature and a portion of which remains dispersed between the ice crystals upon freezing, thus preventing complete solidification of the solution.

5. A hold-over solution for refrigerating apparatus comprising a plurality of liquids only partially miscible at temperatures within the working range, one of which crystallizes at a constant temperature, leaving liquid remaining interspersed between the crystals.

6. A hold-over solution for refrigerating apparatus comprising a mixture of water and butyl alcohol.

7. A hold-over solution for refrigerating apparatus comprising a mixture of water and butyl alcohol in the proportions of 90 to 10 by weight.

8. A hold-over solution for refrigerating apparatus comprising a mixture of water and ethylene-glycol-mono-ethyl-ether-acetate.

9. A hold-over solution for refrigerating apparatus comprising a mixture of water and ethylene-glycol-mono-ethyl-ether-acetate in the proportions of 80 to 20 by weight.

10. A hold-over solution for refrigerating apparatus comprising a mixture of water and dieethylene-glycol-monobutyl-ether.

11. A hold-over solution for refrigerating apparatus comprising a mixture of water and dieethylene-glycol-monobutyl ether in the proportions of 95 to 5 by weight.

12. A holdover solution for refrigerating systems comprising a mixture of water and another liquid which is only partly miscible in water within the working range forming two liquid layers, one of which contains a predominating proportion of water and the other of which contains a predominating proportion of the other liquid.

13. A holdover solution for refrigerating apparatus comprising a mixture of water and another liquid which forms two liquid layers with the water at temperatures within the working range and a third liquid soluble in both the water and the other liquid for lowering the freezing point.

14. A process of refrigeration which includes alternately freezing and melting a holdover solution comprising a mixture of a plurality of liquids only partially miscible within the working range forming two liquid layers so that the greater portion of the solution will freeze and melt at a substantially constant temperature.

15. A holdover solution for refrigerating apparatus comprising a plurality of liquids only partially miscible with one another and an additional liquid substantially completely soluble in two of the other liquids.

JOSEPH FLEISCHER.